United States Patent [19]

Yeh

[11] Patent Number: 5,152,477
[45] Date of Patent: Oct. 6, 1992

[54] ELECTRONIC DETECTION DEVICE FOR DETECTING THE ENDING OF THE REWINDING OF A VIDEO CASSETTE REWINDER

[76] Inventor: Tsun W. Yeh, No. 476 Ming Hu Road, Hsingchu, Taiwan

[21] Appl. No.: 561,692

[22] Filed: Aug. 1, 1990

[51] Int. Cl.⁵ .................................. B65H 63/00
[52] U.S. Cl. ................................ 242/186; 242/57; 242/191
[58] Field of Search ........... 242/186, 189, 190, 191, 242/198, 57; 360/69, 74.1, 74.2, 74.6, 96.1

[56] References Cited

U.S. PATENT DOCUMENTS

| | | | |
|---|---|---|---|
| 3,845,248 | 10/1974 | Andro | 360/69 X |
| 3,930,267 | 12/1975 | Plener | 360/69 |
| 3,999,197 | 12/1976 | Iwashita et al. | 242/191 X |
| 4,343,024 | 8/1982 | Kawai | 360/74.6 |
| 4,533,092 | 8/1985 | Cecchi et al. | 242/186 |
| 4,570,876 | 2/1986 | Andoh et al. | 242/57 X |
| 4,632,333 | 12/1986 | Tarpley, Jr. | 242/186 |
| 4,635,868 | 1/1987 | Jacobson | 242/186 X |
| 4,636,878 | 1/1987 | Murayama | 360/74.6 X |
| 4,646,174 | 2/1987 | Mayashi et al. | 242/186 X |
| 4,794,477 | 12/1988 | Hashiguchi et al. | 242/198 X |
| 4,809,115 | 2/1989 | Shibata et al. | 360/74.6 X |
| 4,851,938 | 7/1989 | Inami | 360/69 |
| 4,862,305 | 8/1989 | Katagiri et al. | 360/74.6 X |
| 4,988,056 | 1/1991 | Shin | 242/57 X |
| 4,993,659 | 2/1991 | Takai et al. | 242/186 |
| 5,018,040 | 5/1991 | Nishida | 242/191 X |
| 5,031,851 | 7/1991 | Yeh | 360/74.2 X |

Primary Examiner—Daniel P. Stodola
Assistant Examiner—John P. Darling
Attorney, Agent, or Firm—Ladas & Parry

[57] ABSTRACT

An electronic device for detecting the conclusion of the rewinding cycle of a video cassette rewinder. When the rewinding cycle is completed, a detection circuit and capacitive level sensing circuit device detect this fact by the signal being sent and transistor and amplifiers communicate this signal to a second motor. This second motor activates movement of a link to open the front of the cassette rewinder and to cut off the power supply. The invention includes a temperature control device which disconnects the rewinding motor once its temperature reaches a certain level.

5 Claims, 2 Drawing Sheets

ELECTRONIC DETECTION DEVICE FOR DETECTING THE ENDING OF THE REWINDING OF A VIDEO CASSETTE REWINDER

FIELD OF THE INVENTION

The present invention relates to a detection device for detecting the conclusion of the rewinding cycle of a video cassette rewinder. It comprises an electronic detection device which detects this conclusion.

SUMMARY OF THE INVENTION

Disclosed herein is an electronic detection device for detecting the end of the rewinding of a video cassette comprising:

a power supply device drawing a proper low divided voltage at the middle of an excitation coil of a motor rectified by a bridge rectifier as a low dc voltage to supply an operating voltage for the whole control circuit;

a temperature control device connected in series to the excitation coil of the rewinding motor of the video cassette rewinder, the circuit being open when the temperature rises to a predetermined level, thereby causing the rewinding motor to stop running;

a detection circuit device coupled to the rotating shaft of the video cassette rewinder and generating cyclic output signals during the rotation of the shaft;

a capacitive level sensing circuit device for receiving the cyclic signal, causing a capacitor thereof to charge and discharge alternatively, and also generating cyclic output signals of a high/low sensing voltage level;

an integrating circuit device connected to the output terminal of the capacitive level sensing circuit device, said device causing the voltage level of the output terminal to increase gradually when a high voltage signal is input; and causing the voltage level of the output terminal to decrease gradually when a low voltage signal is input;

a Zener diode reversely connected to the output terminal of the integrating circuit device; and an output circuit device provided with a switch transistor connected to the output terminal of the Zener diode and a current amplification transistor connected to the switch transistor to drive a video cassette door opening motor or a solenoid to shift a link of the rewinder so as to cause the door of the video cassette holder to disengage and open and then cut off the power supply.

BACKGROUND OF THE INVENTION

The conventional video cassette rewinder uses complicated mechanical members as a device for detecting the end of the rewinding process of the rewinder and for opening a video cassette receptacle by means of the tension difference of the belt. Generally, its drawbacks are as follows.

(1) Durability

The conventional rewinder detects when to open the receptacle by means of the tension difference of the belt. The driving shaft stops under the control of the rotating shaft for video cassettes, upon the completion of the rewinding, and then a tension difference generated by the belt due to a torque of the motor shifts the belt and also the pulleys and the link coupled to the belt to release the engagement portion to disengage and open the cassette holder. For generating sufficient tension difference for accurate detection, the belt should tightly wrap one or more pulleys. Therefore, the belt is in a state of tension for a long period of time. This results in the breakage or the elastic fatigue of the belt. When the belt is operating to continuously rewind, tests have shown that its average lifetime is only 300 hours or 1000–2000 times the number of video cassettes that can be rewinded. Thus, the lifetime of the whole rewinder is affected.

(2) Accuracy

The conventional rewinder detects when to open the receptacle by means of the tension difference of the belt. When the belt is in a state of long term tension, it is likely to break or elasticity fatigue so that it cannot produce a sufficient tension difference upon the completion of the rewinding process. Thus the ability to detect when to open the receptacle is affected. Moreover, since the plastic parts, such as the pushing rod of the pulleys, are formed with undulated edges, the shifting force generated by the tension difference of the belt is not large enough to release the engagement portion of the receptacle of the rewinder, and the ability to detect when to open the receptacle is also affected.

(3) Safety

The conventional rewinder detects when to open the receptacle by means of the tension difference of the belt. When the belt elasticity is worn, or the belt is aged or cracked detection is inaccurate and the video cassette rewinder is not opened. Nevertheless, the circuit of the rewinder is still powered causing the motor to become hot which results in the video cassette rewinder burning.

(4) Speed

The conventional rewinder detects when to open the receptacle by means of the tension difference of the belt. For producing sufficient tension difference, it is necessary to use a motor of larger torque and slower rotating speed. Otherwise, the video tape will be broken or damaged. A motor of high torque and low rotating speed has been tested to rewind a VHST-120 cassette under the condition of the tape not breaking or being damaged. The the rewinding time is about 4 minutes to 4 minutes and 30 seconds. The speed is disatisfactory.

In view of the fact that the existent detection device design of the video cassette rewinder is not ideal, the applicant has dedicated himself to improve the prior design. At last, an electronic detection device for detecting the end of the rewinding of a video cassette in a rewinder is developed.

It is therefore a primary object of this invention to provide an electronic detection device for detecting the end of the rewinding of a video cassette rewinder which detects when to open the receptacle by the control of an electronic circuit. The belt in the rewinder is used only for transmission, and the problem of breakage or fatique of the belt is dimished. The belt of this invention is free from a long term state of tension. Therefore, when it is tested, it can achieve 864 hours over its average lifetime and the number of times it can be rewound is above 12000. Hence the lifetime of the rewinder is enhanced.

It is another object of this invention to provide an electronic detetion device for detecting the end of the rewinding of a video cassette in a rewinder in order to avoid the elastic fatigue, and breakage of the belt, or the inability to produce sufficient displacement to release the engagement portion due to the undulated edges of the transmission parts. Therefore, the accuracy of detecting when to open the receptacle is improved.

It is a further object of this invention to provide an electronic detection device for detecting the end of the rewinding of a video cassette in a rewinder, in which a motor having a high speed of rotation and low torque is used. When the motor is tested under the requirement that the tape not be damaged or broken, only 2 minutes and 30 seconds or so are needed to rewind a VHST-120 cassette. The rewinding time is significantly shortened.

It is further object of this invention to provide an electronic detection device for detecting the end of the rewinding of a video cassette in a rewinder having a temperature control device. When the temperature of the motor rises to 80 degrees centigrade the temperature control device opens the circuit to disconnect the power supply of the motor. When the temperature of the motor is reduced to ambient temperature, the power supply reconnects automatically. The case of the motor being powered to produce a high temperature and burn due to belt wear can be avoided, hence safety is improved.

Therefore, in order to achieve the above objects, the inventive electronic detection device for detecting the end of the rewinding of a video cassette in a rewinder comprises: a power supply device drawing a proper low divided voltage at the middle of an excitation coil of the motor rectified by a bridge rectifier as a low dc voltage to supply an operating voltage for the whole control circuit; a temperature control device connected in series to an excitation coil of the rewinding motor of the video cassette rewinder, said control device being open when the temperature rises to a predetermined level, thereby causing the rewinding motor to stop running; a detection circuit device coupled to the rotating shaft of the video cassette rewinder, generating cyclic output signals during the rotation of the shaft; a capacitive level sensing circuit device for receiving the cyclic signals, causing a capacitor thereof to charge and discharge alternately, and also generating cyclic output signals of a high/low voltage level; an integrating circuit device connected to the output terminal of the capacitive level sensing circuit device, causing the voltage level of the output terminal to increase gradually when a signal of high voltage is input; and causing as well the voltage level of the output terminal to decrease gradually when a signal of low voltage is input; a Zener diode reversely connected to the output terminal of the integrating circuit device; and an output circuit device provided with a switch transistor connected to the output terminal of the Zener diode and a current amplification transistor connected to the switch transistor to drive a video cassette receptacle opening door motor or a solenoid to shift a link of the rewinder so as to cause the door of the receptacle to disengage and open.

BRIEF DESCRIPTION OF THE DRAWINGS

This invention can be better understood from the following description of a preferred embodiment of the invention when read in conjunction with the drawings in which.

DETAILED DESCRIPTION OF THE INVENTION

Figure 1:
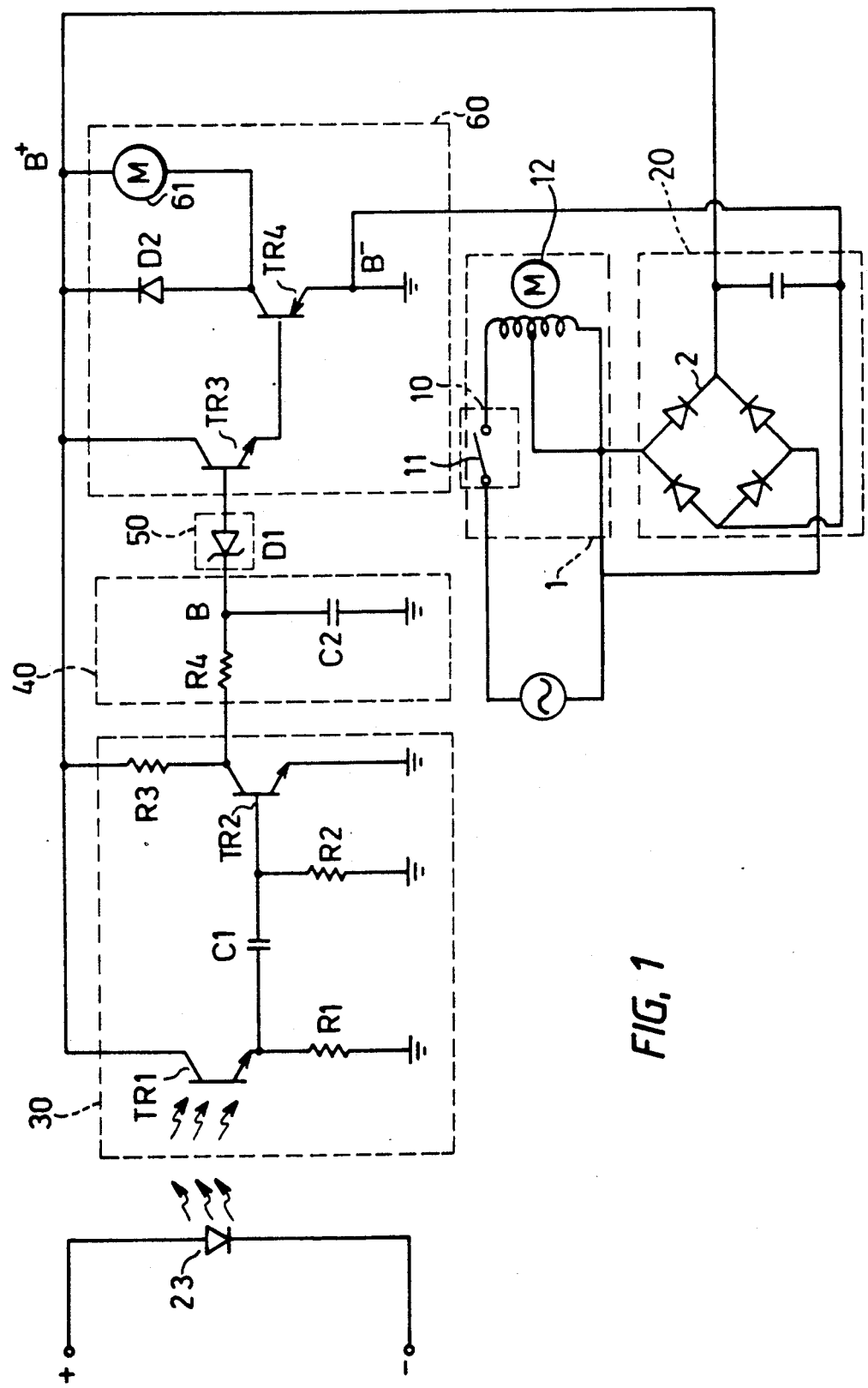
FIG. 1 is a detailed circuit diagram of an electronic detection device for detecting the end of the rewinding of a video cassette in a rewinder according to the invention.
Figure 2:
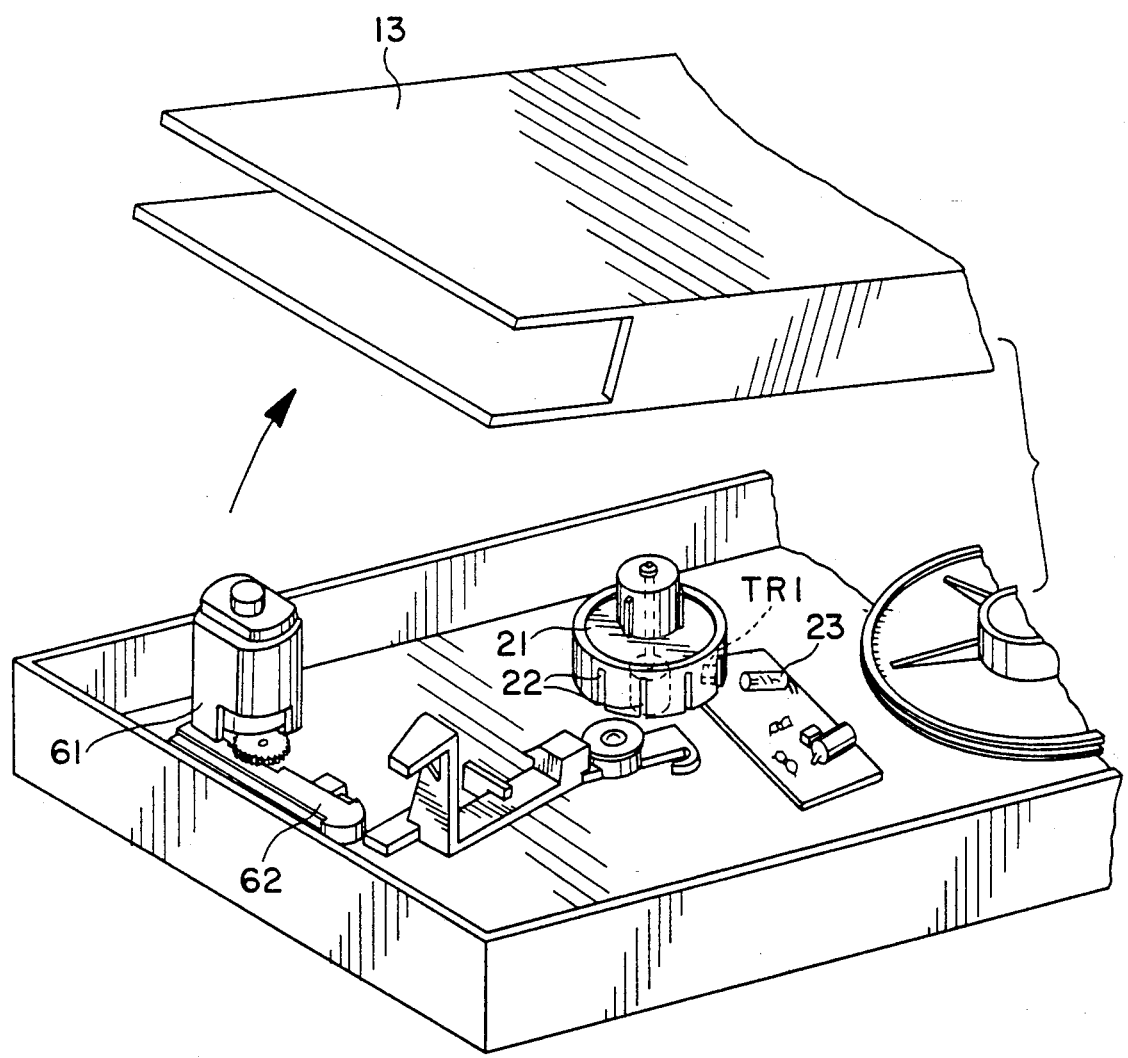
FIG. 2 is a schematic view of a detection structure of an electronic detection device for detecting the end of the in a rewinding of a video cassette rewinder according to the invention.

Referring to FIG. 1, an electronic detection device for detecting the end of the rewinding of a video cassette in a rewinder comprises: a power supply device 1, a temperature control device 10, a detection circuit device 20, a capacitive level sensing circuit device 30, an integrating circuit device 40, a Zener diode 50 and an output circuit device 60, wherein the power supply device 1 draws a proper low divided voltage at the middle of the excitation coil of the motor 12 rectified by a bridge rectifier 2 as a low dc voltage to supply an operating voltage for the whole control circuit;

the temperature control device 10 is provided with a temperature switch 11, which is connected in series to an excitation coil of the rewinding motor of the rewinder and when open causes the rewinding motor to stop running. The switch opens when the temperature of the motor rises to a predetermined level;

Referring to FIGS. 1 and 2 together, the detection circuit device 20 is coupled to a photomask 21 at the bottom of the rotating shaft of the rewinder. The photomask 21 is provided with a plurality of optical gates 22, wherein a LED 23 provided outside of the photomask 21 emits light beams through the optical gates 22 during the rotation of the rotating shaft such that twinkling cyclic optical output signals are generated.

The capacitive level sensing circuit device 30 is provided with a phototransistor TR1. The input terminal of the base of the phototransistor is connected to the twinkling cyclic optical signals to cause the phototransistor TR1 to turn ON and OFF alternatively, and thus a capacitor C1 connected to the emitter of transistor TR1, is forced to charge and discharge alternately and also generate cyclic signals of high/low voltage which are output by the collector (node A) of a transistor TR2.

The integrating circuit device 40 consists of a resistor R4 and a capacitor C2. The input terminal of the resistor R4 is connected to the output terminal of the capacitive level sensing circuit device 30, which causes the voltage level of the node B thereof to increase gradually when a high voltage signal is input, and causes the voltage level of the node B thereof to decrease gradually when a low voltage level signal is input.

The Zener diode 50 is reversely connected to the output terminal (node B) of the integrating circuit device 40.

The output circuit device 60 is provided with a switch transistor TR3 connected to the output terminal of the Zener diode 50 and a current amplification transistor TR4 connected to the switch transistor TR3 to drive a video cassette receptacle door opening motor 61 or a solenoid and thus link up a link 62 to be displaced so as to cause the door of the receptacle 13 to disengage and open.

Therefore, at the instant when the light is incident on the phototransistor TR1, the capacitor C1 is caused to charge and discharge such that the voltage level of node A changes cyclically from high to low and back to high.

When node A returns to the high voltage level, the integrating circuit consisting of the resistor R4 and capacitor C2, causes the voltage level of node B to increase gradually. When the voltage level of node B exceeds the Zener breakdown voltage of the diode 50, the diode 50 conducts and thus the transistor TR3 conducts so that a current is amplified by the transistor TR4 to drive the motor 61.

When the rewinding motor of the rewinder enables the rotation of the rotating shaft to rewind a video cassette, the voltage level of node B repeats increase and decrease operations alternately according to the twinkling cyclic optical signals. Then the voltage level of node B is always lower than the Zener breakdown voltage of the diode 50, thus neither the output circuit device 60 conducts, nor the receptacle opening motor 61 operates. On the contrary, at the end of the rewinding, the optical signals do not twinkle cyclically any more. The voltage level of node B increases continuously until it exceeds the Zener breakdown voltage of the diode 50. The diode 50 then becomes conductive and the transistor TR3 functions so that the current passing therethrough is amplified by the transistor TR4 to drive the motor 61 and thus link up the link 62 to displace it thereby causing the front end or door of the video cassette receptacle 13 to disengage and open.

The above illustrated description disclosed by the present invention is only an embodiment. Equivalent variations or modifications according to the spirit and scope of the invention can be made by those of ordinary skill in the art without departing from the scope of the invention as defined by the claims.

I claim:

1. An electronic detection device powered by a power supply for detecting the end of the rewinding of a video cassette turned by a rotation shaft housed within a video cassette rewinder and having a movable door powered by a powering means for removal of said cassette, said electronic detection device comprising:

an excitation coil of a rewinding motor housed in said rewinder;

a temperature control device connected in series to the excitation coil of the rewinding motor of the video cassette rewinder, said temperature control device opening the series connection when the temperature of said rewinding motor rises to a predetermined level thereby causing the rewinding motor to stop running;

a detection circuit device coupled to the rotating shaft of the video cassette rewinder, said detection circuit device generating cyclic output signals during the rotation of the shaft;

a capacitive level sensing circuit device having a capacitor therein and an output terminal, said circuit acting to receive said cyclic signals, said signals causing said capacitor to alternately charge and discharge and to generate cyclic output signals of high and low voltage;

an integrating circuit device connected to the output terminal of said capacitive level sensing circuit device, causing the voltage level of the output terminal to increase gradually when a high voltage signal is input and causing the voltage level of the output terminal to decrease gradually when a low voltage signal is input;

a Zener diode connected in reverse to the output terminal of the integrating circuit device;

an output circuit device provided with a switch transistor connected to the output terminal of said Zener diode and a current amplification transistor connected to said switch transistor to drive said powering means to cause the front end of the cassette rewinder to disengage and open and then to cut off power supplied to said device.

2. The electronic detection device of claim 1, wherein said temperature control device consists of a temperature switch.

3. The electronic detection device of claim 1, further comprising a photomask at the bottom of the rotating shaft of the rewinder, said photomask defining a plurality of optical gates therein and being coupled to said detection device; and a LED provided between said photomask and the rotating shaft to generate said cyclic output signals which are twinkling cyclic optical output signals during the rotation of the rotating shaft.

4. The electronic detection device of claim 3, wherein said capacitive level sensing circuit device is comprised of a prestage phototransistor and a post-stage transistor, the input terminal of the base of the phototransistor being connected to said twinkling cyclic optical signals to cause the phototransistor to alternately turn ON and OFF, the capacitor being connected to the emitter of the phototransistor and thereby alternately charging and discharging generating cyclic signals of high and low voltage which are output by the collector of the post-stage transistor.

5. The electronic detection device of claim 1, wherein said integrating circuit device comprises a resistor and a capacitor having a first end and a second end connected to ground, the input terminal of said resistor being connected to the output terminal of said capacitive level sensing circuit device to cause the voltage level at the first end to increase gradually when a high voltage signal is input and to cause the voltage level at the first end to decrease gradually when a low voltage signal is input.

* * * * *